Aug. 22, 1967 J. R. FITZPATRICK 3,336,940
PRESSURE RESPONSIVE MEANS
Filed April 26, 1965 3 Sheets-Sheet 3

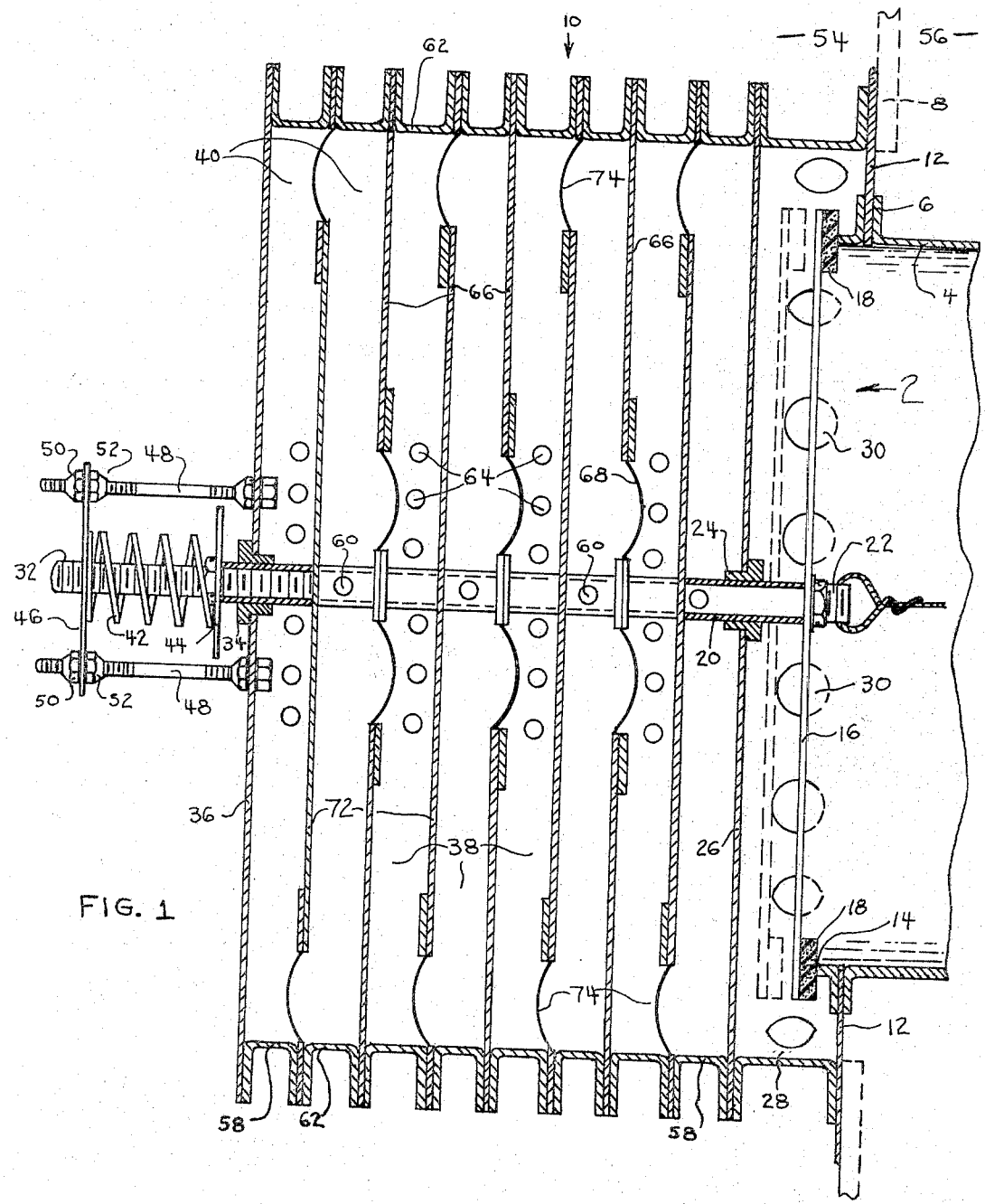

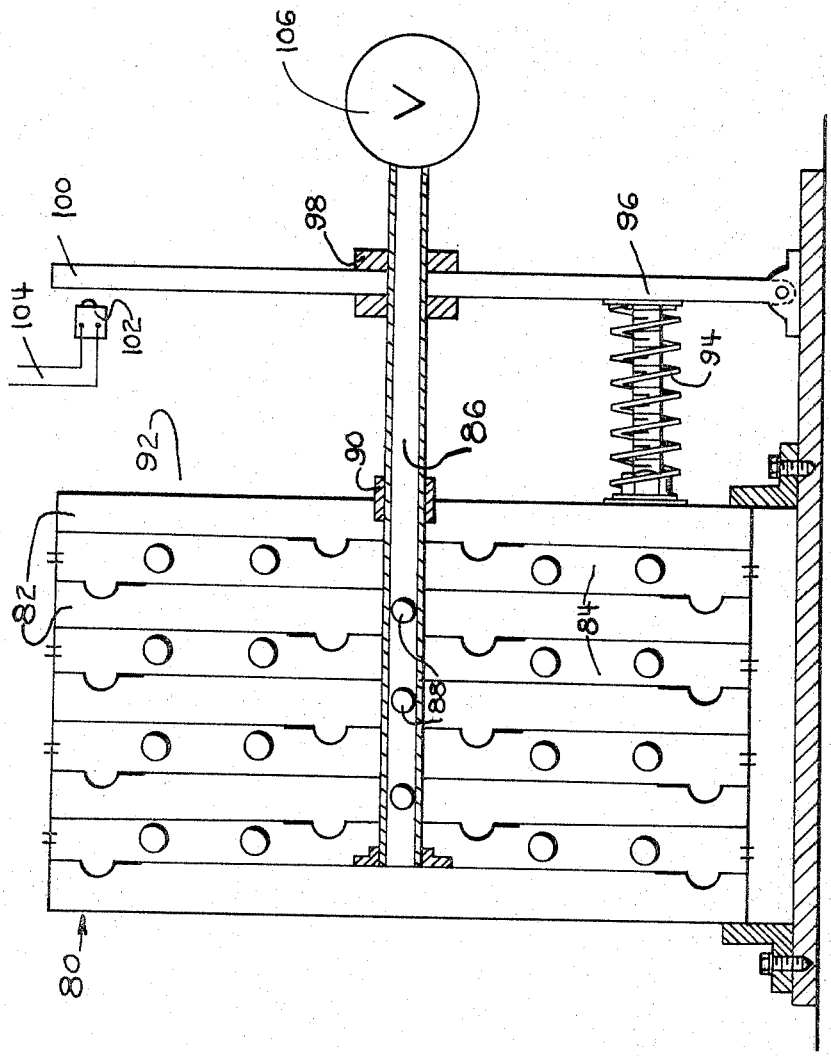

INVENTOR.
JOHN R. FITZPATRICK
BY
Albert Sperry

United States Patent Office 3,336,940
Patented Aug. 22, 1967

3,336,940
PRESSURE RESPONSIVE MEANS
John R. Fitzpatrick, Levittown, Pa., assignor to Aereon Corporation, King of Prussia, Pa., a corporation of Pennsylvania
Filed Apr. 26, 1965, Ser. No. 450,946
6 Claims. (Cl. 137—494)

This invention relates to pressure responsive means which are characterized by their sensitivity and response to very limited differences in pressure and their ability to actuate devices, such as valves, switches, measuring, recording and other mechanisms.

This application is a continuation-in-part of copending application Ser. No. 253,357, now Patent No. 3,180,590.

In said copending application, a novel type of actuating means is shown and described for use in operating a valve to control the pressure of air within the envelope of an airship. For this purpose, the device is designed to respond to relatively small differences between the pressure of air existing within the envelope and the ambient air. The pressure responsive actuating means is, however, of general application and may be used in combination with other types of valves and equipment and in actuating various elements in response to relatively small changes or variations in pressures. Thus, for example, when employed for actuating a valve, the valve may be relatively large and serve to control the pressure of air within an extensive enclosure in response to changes in atmospheric pressure so as to stabilize the pressure therein. Such valve controlled combinations may also be used in buildings and enclosures of the type known generally as "clean rooms" and the like. However, the novel actuating means of the present invention has many other applications and uses in effecting the control or operation of equipment in response to relatively small changes in pressure. Thus, the actuating means may be used for barometric control of parachutes or other equipment, for the operation of measuring, sensing and safety devices utilized at relatively low pressures or in a substantial vacuum or at high altitudes, and it may be employed under conditions wherein pressure variations are indicative of a change in a condition such as velocity, the direction of air or fluid flow or the temperature of an enclosed gas or the like.

In attaining the advantages of the present invention, a plurality of individually responsive bellows or pressure responsive elements are connected to a single actuating means whereby the force exerted on all of such means are added and applied to a single actuating element. In this way, even though the pressure differential and the force exerted by any single element on the actuating means may itself be very small, the total force applied or the distance which the actuating means may be moved will be sufficient to assure extreme sensitivity and reliability of operation of a device.

Accordingly, the principal objects of the present invention are to provide novel pressure responsive means for actuating a valve or other device, to add or multiply the forces and effects exerted upon a plurality of pressure responsive elements for actuating a single device, and to provide improved combinations embodying sensing and actuating elements for use in the control of various types of equipment.

These and other objects and features of the present invention will appear from the following description thereof wherein reference is made to the drawings to illustrate typical constructions and combinations embodying the invention.

In the drawings:

FIG. 1 is a sectional view of a typical actuating means embodying the present invention as used in operating a valve in a lighter-than-air craft.

FIG. 2 is a sectional view through an actuating device embodying the present invention as used in combination with electrical switching means; and FIG. 3 is a diagrammatic illustration of equipment embodying the present invention as used with recording means.

Figure 5:
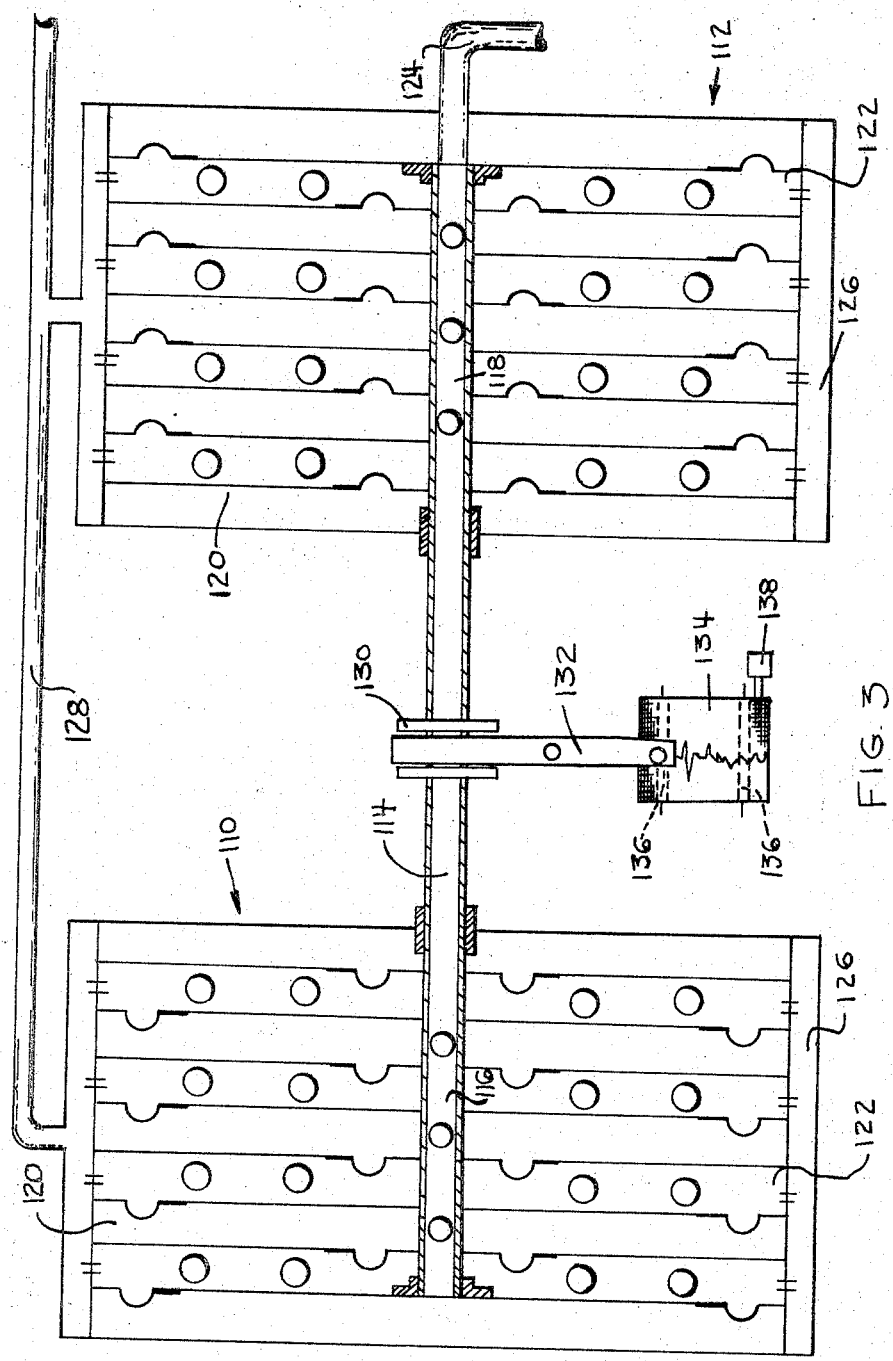

In that form of the invention chosen for purposes of illustration in FIG. 1, pressure responsive means may be employed for actuating a valve. Thus as described in said copending application for patent, it is sometimes desirable to maintain the air within the envelope and about the gas containing cells of an airship at a pressure which is greater than that of the ambient air. In this way, forces exerted on the airship framework and its envelope or covering due to changes in temperature, barometric pressure, wind velocity and the like can be materially reduced. Although the pressure of the air within the airship envelope and about the buoyant gas-containing cells can be controlled or varied to some extent by controlling the operation of a blower and/or the operation of ram air pressure means, such control will seldom be sufficiently sensitive for most operating conditions. Therefore, it is most desirable to provide the airship with a pressure relief valve which will serve to limit the pressures within the hulls.

As shown in FIG. 1, such a pressure relief valve is indicated at 2 and is employed in combination with a pressure relief tube 4 mounted on a support 6 and communicating with the interior of the envelope 8 of an airship. In view of the great area presented in an airship envelope, the total pressure to which the envelope is subjected may vary greatly with even a minute variation in the pressure of the air within the envelope. Therefore, the pressure relief valve 2 is provided with actuating means indicated generally at 10 to control and maintain the desired air pressure within the envelope with extreme sensitivity. Thus, the valve actuating means 10 should be constructed and designed so as to operate the valve 2 at pressures not exceeding 0.1 inch of water and to respond to variations in pressure in that range which may not be more than 0.02 inch of water. Furthermore, in view of the tremendous volume of air within the envelope of even a relatively small airship and the large amount of air which must be vented to produce a significant change in the pressure of such air, the valve 2 must be movable or have a capacity to permit the flow of large volumes of air therethrough within a relatively short period of time. No satisfactory valves having such capabilities and sensitivity are readily available. Therefore, it may be necessary or desirable to construct a special form of pressure relief valve for use as indicated at 2.

The air pressure relief valve 2 is of suitable dimensions to have the desired capacity and capabilities and may be located at any suitable point in the airship envelope. As shown in FIG. 1, the valve embodies a plate 16 provided with a marginal valve seal 18 formed of any suitable yieldable sealing material such as cellular rubber, neoprene or other elastomeric material and designed to engage a valve seat 14 on the outer end of the air pressure relief tube 4.

Valve member 16 is secured to the inner end of a tubular valve stem 20 by means of a nut or the like threaded onto the exterior of the open inner end 22 of the tubular valve stem 20. The inner end of the valve stem 20 extends through an air pressure sealing bushing 24 carried by a stationary inner end plate 26 of the valve assembly. Inner plate 26 is held in place and spaced from the mounting plate 12 by an air outlet ring 28 provided with a plurality of openings 30 through which air may flow freely upon movement of the valve member 16 to its opened dotted line position of FIG. 1.

The outer end 32 of the tubular valve stem 20 is closed and extends through an air sealing bushing 34 carried by the stationary outer end plate 36 of the valve assembly. A plurality of spacer rings are located between the inner end plate 26 and the outer end plate 36 of the valve and are secured together so as to cooperate in forming a plurality of air pressure chambers 38 and a plurality of intervening relief or ambient air chambers 40 between the end plates 26 and 36. However, the valve stem 20 which extends axially through all of the valve chambers is movable relative to the stationary end plates for actuating the valve member 16.

The valve member 16 is normally urged toward the valve seat ring 14 to close the valve by the action of a spring 42 which surrounds the closed outer end portion 32 of the valve stem projecting through the outer end plate 36 of the valve assembly. One end of the spring 42 bears against a collar 44 secured to the threaded outer end 32 of the valve stem; whereas, the other end of spring 42 bears against a retainer plate 46 mounted on the threaded bolts 48 secured to the stationary outer end plate 36 of the valve assembly. The position of the retainer plate 46 and the pressure with which the spring 42 urges the valve plate 14 against the valve seat ring 14 can be varied as desired by adjustment in the position of the supporting nuts 50 and lock nuts 52 on the bolts 48.

As indicated above, the valve actuating means 10 embodies a plurality of air pressure chambers indicated at 38 arranged in alternate relation with relief or ambient air chamber 40. Four air pressure chambers and four ambient air chambers are shown in the valve assembly of FIG. 1, but any suitable or required number of such chambers may be employed. The air pressure chambers 38 are closed about their outer edges by imperforate ring-like spacer members 58, but are placed in communication with the air within the airship envelope by openings 60 in the tubular valve stem 20 which presents its open inner end 22 to the air pressure relief tube 4. The pressure of the air within the air pressure chambers 38 will, therefore, correspond to the pressure of the air throughout the airship envelope and may be of the order of about ½ inch of water pressure in excess of the ambient air about the airship.

The ambient air chambers 40 are provided at their outer edges wtih ring-like spacer members 62 which are provided with outlet openings 64 so that the pressure of the air within the chambers 40 will correspond to that of the ambient air about the airship or other space where the valve 2 is located.

The air pressure chambers 38 are separated from the relief or ambient air chambers 40 by means of pressure plates 66 which are secured in place at their outer edges by the imperforate ring-like spacer members 58 and the perforated ring-like spacer members 62. The ring-like spacer members 58 and 62 are, in turn, secured in place between the stationary inner and outer end plates 26 and 36 of the valve assembly. While the pressure plates 66 are, thus, held in fixed positions, the inner edges of the plates 66 are connected to the movable valve stem 20 of the valve by a flexible element 68.

The opposite side of each air pressure chamber is defined by a valve actuating diaphragm 72 which is secured to the valve stem 20 so as to move the valve stem and valve member 16 toward and away from its valve seat ring 14. The outer edge of the diaphragm 72 is provided with a flexible connection 74 which is sealed at its outer edge between the ring-like spacer members 58 and 62.

With this construction, variations in pressure of the air within the airship envelope will be transmitted promptly to the air relief tube 4 and relief valve 2. Such pressure will then be applied through the open inner end 22 of the tubular valve stem 20 and the openings 60 in the valve stem to the air pressure chambers 38 of the valve. The pressure within the air chambers 38 will thereby be caused to differ from the pressure of the air within ambient air chambers 40 of the valve actuating means 10. The valve actuating diaphragms 72 secured to valve stem 20 will accordingly be moved to actuate valve member 16 in response to differences between the pressure of the air on the interior and the exterior of the envelope 8 of the airship. At the same time, the spring 42 may be adjusted to assure the preservation of a predetermined air pressure within the airship envelope.

The use of multiple air pressure chambers 38 to actuate the valve 16 renders it possible to multiply the force exerted on the valve stem 20 by each individual valve actuating diaphragm 72 in the assembly. Therefore, the valve 16 can be made extremely sensitive and capable of responding to relatively minute variations in the air pressure within the airship hulls. Nevertheless, the capacity of the air pressure relief valve can be made sufficiently great to assure prompt and effective control of the air pressure within the various airship hulls.

The pressure responsive means 10 illustrated can, of course, be employed to actuate other types and sizes of valves in response to differences in the pressure of fluids derived from any sources and supplied to the pressure and exhaust chambers 54 and 56. Thus the invention can be employed to control the air pressure within the fuselage of an aircraft, to admit or vent air within a closed stadium, building or other enclosure, to meter the flow of gasoline or fluid to an engine at varying altitudes or to control other types of devices or mechanism.

In a similar way, the actuating means of the present invention may be employed in combination with many other types of equipment designed to respond or be actuated upon variation in pressures. Thus as shown in FIG. 2, the control device 80 may be similar to that shown in FIG. 1 and embody pressure chambers 82 and relief chambers 84. The tubular shaft 86 communicates with the pressure chambers 82 through openings 88 and is slidably movable through a packing gland 90 in the stationary end plate 92 of the control device. The shaft 86 is urged to the left as seen in FIG. 2 by means of a compression spring 94 confined between end plate 92 and to a pivoted arm 96 engageable with a collar 98 on shaft 86. The arm 96 further has an end portion 100 engageable with a microswitch or the like 102 to energize an electrical circuit 104 for actuating a device to be controlled in response to a predetermined difference in pressure of the fluids in the pressure and relief chambers 82 and 84 of the actuating device 80.

Constructions of this type may be used for example in release or operating systems employed with parachutes or other equipment designed to respond to variations in pressure resulting from changes in altitude or other limited pressure differentials. For this purpose, the shaft 86 may be provided with a valve means 106 which may be closed when the equipment is at a high altitude, say 20,000 or 30,000 feet whereby the pressure of the air within the pressure chambers 82 of the actuating device will be fixed at a predetermined or existing valve corresponding to the pressure of the air then existing in the relief chambers 84. However, when the parachute or equipment descends to a lower altitude, say 2,000 or 3,000 feet, where the ambient air is at a pressure exceeding that previously established in the pressure chambers 82, the pressure of the air in the relief chambers will increase so as to move the tubular shaft 86 to the left as seen in FIG. 1. The pivoted arm 96 will then be moved to the left against the action of compression spring 94 so as to cause the end portion 100 of the arm to engage and actuate the microswitch 102. The circuit 104 will then be energized to actuate release mechanism for a parachute or other device at a predetermined altitude.

In that form of the invention illustrated in FIG. 3, two complementary pressure responsive actuating devices indicated at 110 and 112 are arranged for additive action upon a common tubular shaft 114. For this purpose, the portion 116 of shaft 114 is acted upon by the actuating device 110 whereas the portion 118 of shaft 114 is acted upon by the elements of the actuating device 112. The pressure chambers 120 and the relief chambers 122 of the two actuating devices are arranged in the same sequence within the devices so that both devices urge the shaft 114 in the same direction in response to differences in pressure of the fluid in the pressure and relief chambers. Further as shown in FIG. 3, the pressure of the fluid supplied to the pressure chambers 120 may be received from a remote source through a connection 124 whereas the relief chambers 122 may communicate with casings 126 provided with a common connection 128 for controlling the pressure impressed on the fluid in the relief chambers 122 of both actuating devices. In this way, the invention may be provided with a relatively large number of pressure and relief chambers and present an extended area to the pressure responsive diaphragms between the chambers. As a result, the size of the pressure responsive means may be limited whereas the total area of the pressure responding diaphragms and the force exerted on the tubular shaft may be relatively great or the sensitivity of the pressure responsive means may be substantially increased.

As shown diagrammatically in FIG. 3, the mechanism is employed to actuate a recording device by providing a collar 130 on shaft 114 for actuating a pen or scribing device 132 cooperating with a graph or sheet 134 which is movable beneath the scribing device over rollers 136 adapted to be driven by clockwork 138 or other means.

Such a recording device will be capable of producing a continuous record of extremely low pressure differentials and may be employed in gas pipe lines to record and measure the volume of gas passing through the line. In the alternative, the connections 124 and 128 may be connected to venturi, pilot tubes or other velocity measuring or fluid responsive means to provide an accurate indication or record of conditions to be measured or indicated.

In each of the forms of the invention illustrated, the pressure responsive means embodies a plurality of stationary and movable diaphragms defining opposite sides of the pressure and relief chambers in combination with a shaft or member connected to and movable by the movable diaphragms or walls of the chambers. The movable shaft or member is employed to actuate a movable member of a device such as a valve, switch, recorder or the like. At the same time, the total area of the movable diaphragms and the arrangement thereof is such as to exert an additive or multiple force on the shaft or movable member whereby relatively minute pressure differentials and forces may be utilized to attain an amplified movement or effect which would not otherwise be attainable.

It will thus be apparent that the present invntion is capable of many alternative embodiments and applications in combination with devices adapted to be actuated in response to relatively limited differences in pressure. In view thereof, it should be understood that the particular forms and combinations of the invention illustrated in the drawing and described above are intended to be illustrative only and are not intended to limit the scope of the invention.

I claim:

1. Pressure responsive means for actuating a movable member of a device comprising a plurality of pressure chambers and relief chambers arranged in adjacent positions and in alternate relation with respect to each other, movable diaphragms each of which constitutes a common wall separating one of said pressure chambers from an adjacent relief chamber, a tubular shaft passing through said chambers, said diaphragms each having its outer edge held in a fixed position and having its inner edge connected to said tubular shaft, said shaft having openings therein communicating with each of said pressure chambers and with one source of fluid pressure, each of sair relief chambers having an opening therein communicating with a second source of fluid pressure, means yieldably urging said shaft axially in one direction, said shaft being movable in the opposite direction by said diaphragms in response to differences in the pressure of the fluids in said pressure chambers and relief chambers, and said shaft being operably connected to said movable member of said device to actuate the same upon axial movement of said shaft.

2. Pressure responsive means for actuating a movable member of a device, said pressure responsive means comprising a plurality of adjacent pressure chambers and relief chambers located in adjacent positions, a tubular shaft extending axially through said chambers and having openings therein communicating with said pressure chambers, means for impressing fluid pressure from one source to said pressure chambers through said tubular shaft and openings, said relief chambers having openings therein communicating with a different source of fluid pressure, diaphragms connected to said tubular shaft and forming a common wall between said pressure chambers and relief chambers, said diaphragms being movable in response to a difference in pressure of the fluids in said pressure chambers and relief chambers to move said tubular shaft axially, and a connection between said tubular shaft and the movable member of said device for actuating said movable member upon axial movement of said shaft.

3. Pressure responsive actuating means for actuating a movable member of a device, comprising an outer, rigid generally cylindrical casing, a tubular shaft movable axially within said casing and communicating with a source of fluid pressure, a plurality of movable diaphragms extending transversely of said casing and cooperating to define a plurality of adjacent pressure chambers and relief chambers within said casing, said diaphragms being fixedly connected to said casing at the outer edges thereof and connected to said shaft at the inner edges thereof, said tubular shaft having openings therein communicating with said pressure chambers, said casing having fluid venting openings therein communicating with said relief chambers, and means connected to said shaft and to the movable member of said device to actuate said device upon axial movement of the shaft by said diaphragms in response to a difference in the pressure of fluid in said pressure chambers and relief chambers.

4. Pressure responsive means for actuating a movable member of a device, comprising an outer, rigid substantially cylindrical casing, a tubular shaft movable axially within said casing, an assembly of diaphragms located within the casing and extending radially thereof, alternate diaphragms of said assembly being in the form of discs fixedly secured at their inner edges to said tubular shaft, the outer peripheral portions of said alternate diaphragms being formed of flexible material secured at their inner edges to said discs and secured at their outer edges to said rigid casing, intermediate diaphragms of said assembly being located between said alternate diaphragms and being in the form of annular plates fixedly secured at their outer edges to said casing and having their inner edges spaced from said tubular shaft, the inner portions of said intermediate diaphragms being formed of flexible material connected at their outer edges to said annular plates and connected at their inner edges to said tubular shaft, said alternate and intermediate diaphragms cooperating to define a plurality of adjacent pressure chambers and relief chambers located within said casing, said tubular shaft having openings therein communicating with said pressure chambers and to one source of fluid under pressure, said casing having openings therein communicating with said relief chambers and to another source of fluid under pressure, said tubular shaft being movable axially of said casing by the discs of the alternate diaphragms in response to a change in the pressure of the fluid from said sources, and means connected to said tubular shaft and to said movable member of said device to actuate said movable member.

5. Means for controlling the pressure of air within a space which may be subjected to air pressure exceeding the pressure of ambient atmospheric air, said means comprising a tube communicating with said space, a valve member movable into and out of position to close said tube, said valve member presenting one face subjected to the pressure of air within said space and on opposite face in communication with ambient atmospheric air, spring means urging said valve member toward a position wherein it will close said tube, a plurality of pressure chambers and relief chambers arranged in adjacent positions, a tubular shaft connected to said valve member and providing communication between said space and each of said pressure chambers, said relief chambers having openings therein communicating with the ambient atmospheric air, movable diaphragms each forming a common wall between one of said pressure chambers and an adjacent relief chamber, said diaphragms being connected to said tubular shaft to move the shaft and valve member to open said tube and vent air from said space when the pressure of the air in said space exceeds the pressure of atmospheric air by an amount sufficient to overcome the action of said spring means.

6. In combination with a valve having a valve seat, a valve member movable into and out of engagement with said valve seat, said valve member being urged toward said valve seat by atmospheric pressure applied to one face thereof, spring means additionally urging said valve member toward said valve seat, pressure responsive actuating means for moving said valve member away from said valve seat against the action of atmospheric pressure and said spring means, said pressure responsive means comprising a tubular shaft connected to said valve member and communicating with fluid on the opposite face of said valve member, a plurality of pressure chambers communicating with said fluid on said opposite face of the valve member through openings in said tubular shaft, a plurality of relief chambers interposed between said pressure chambers and separated from the pressure chambers by movable diaphragms connected to said shaft, said relief chambers having openings therein venting to the atmosphere to permit movement of said diaphragms, shaft and valve member in response to a predetermined difference in the pressure of the fluid on said opposite side of the valve member and atmospheric pressure.

No references cited.

WILLIAM F. O'DEA, *Primary Examiner.*

H. W. WEAKLEY, *Assistant Examiner.*